US012710342B2

(12) United States Patent
Kaushansky et al.

(10) Patent No.: US 12,710,342 B2
(45) Date of Patent: Aug. 18, 2026

(54) DEVICES, SYSTEMS, AND METHODS FOR AUTOMATED DISSECTION AND PROCESSING OF BIOLOGICAL SAMPLES

(71) Applicant: Seattle Children's Hospital, Seattle, WA (US)

(72) Inventors: Alexis Kaushansky, Seattle, WA (US); Brian Zephyr Pitre, Seattle, WA (US); Tess Seltzer, Seattle, WA (US); Christopher Sutanto, Seattle, WA (US); Samantha Brown, Seattle, WA (US); Thurston Herricks, Seattle, WA (US)

(73) Assignee: Seattle Children's Hospital, Seattle, WA (US)

( * ) Notice: Subject to any disclaimer, the term of this patent is extended or adjusted under 35 U.S.C. 154(b) by 918 days.

(21) Appl. No.: 17/997,909

(22) PCT Filed: May 14, 2021

(86) PCT No.: PCT/US2021/032534
§ 371 (c)(1),
(2) Date: Nov. 3, 2022

(87) PCT Pub. No.: WO2021/231918
PCT Pub. Date: Nov. 18, 2021

(65) Prior Publication Data

US 2023/0228653 A1 Jul. 20, 2023

Related U.S. Application Data

(60) Provisional application No. 63/024,733, filed on May 14, 2020.

(51) Int. Cl.
*G01N 1/00* (2006.01)
*G01N 1/28* (2006.01)

(52) U.S. Cl.
CPC ..... *G01N 1/286* (2013.01); *G01N 2001/2866* (2013.01); *G01N 2001/2873* (2013.01)

(58) Field of Classification Search
None
See application file for complete search history.

(56) References Cited

U.S. PATENT DOCUMENTS

2008/0148913 A1 6/2008 Chen et al.
2015/0069692 A1 3/2015 Finazzo et al.
(Continued)

FOREIGN PATENT DOCUMENTS

CN 206566035 U 10/2017

OTHER PUBLICATIONS

International Search Report and Written Opinion as mailed on Oct. 27, 2021, issued in corresponding International Application No. PCT/US2021/32534, filed May 14, 2021, 8 pages.

*Primary Examiner* — Jyoti Mutreja
(74) *Attorney, Agent, or Firm* — CHRISTENSEN O'CONNOR JOHNSON KINDNESS PLLC

(57) ABSTRACT

Systems, apparatuses, and methods enable rapid, repeatable, and accurate dissection of arthropods. Arthropod dissection apparatuses includes a shear dissection mechanism having a primary shear body and a secondary shear body. The primary shear body includes at least an inlet channel, a first outlet channel, and a second outlet channel formed therein. The secondary shear body is disposed in an aperture of the primary shear body and has a dissection chamber formed therein. The secondary shear body is movable between a first position and a second position relative to the primary shear body, which causes a shearing action at a shearing interface between the secondary shear body and the primary shear body.

24 Claims, 16 Drawing Sheets

(56) References Cited

U.S. PATENT DOCUMENTS

2015/0135920 A1 5/2015 Hu et al.
2017/0355951 A1 12/2017 Taylor et al.
2019/0025163 A1* 1/2019 Carrano .................. B01L 3/502

* cited by examiner $I_1$ $I_2$ $I_1$ $I_2$ $O_1$ $O_2$ $O_1$ $O_2$

DEVICES, SYSTEMS, AND METHODS FOR AUTOMATED DISSECTION AND PROCESSING OF BIOLOGICAL SAMPLES

CROSS-REFERENCES TO RELATED APPLICATIONS

This application is a National Stage of International Application No. PCT/US2021/032534 filed May 14, 2021, which claims the benefit of U.S. Provisional Application No. 63/024,733, filed May 14, 2020, the entire disclosures of which are hereby incorporated by reference in their entirety for all purposes.

STATEMENT OF GOVERNMENT LICENSE RIGHTS

This invention was made with U.S. Government support under GM101183 awarded by the National Institutes of Health. The U.S. Government has certain rights in the invention.

BACKGROUND

Malaria remains the deadliest vector-borne disease, causing over 400,000 deaths and hundreds of millions of infections each year. Gains have been made against the malaria death toll over the past 15 years, mainly as a result of highly effective artemisinin-based combination therapies, insecticide spraying, and habitat control. Unfortunately, these gains have plateaued over the past five years with the rise of insecticide resistance and loss of sensitivity to artemisinin. While many regions have been declared malaria-free for the first time, other areas report increased malaria cases and deaths. As such, a highly effective vaccine, even one that is only available for acute transmission settings, could provide an important tool in the fight against malaria. In 2015, the most advanced malaria vaccine, RTS,S/AS01, which is based on the administration of a subunit of a highly expressed protein on the parasite surface, circumsporozoite protein, was licensed as Mosquirix™. More recently, RTS, S/AS01 has been rolled out for use in Ghana, Kenya, and Malawi, despite limited and short-term efficacy. Additional strategies are needed for malaria eradication.

The malaria life cycle offers both clues to inform interventional strategies and roadblocks for robust experimentation. The malaria parasite is first transmitted to humans by infected Anopheles mosquitoes during its sporozoite form. Once the sporozoite has been deposited into the skin, it travels between and through skin cells, then traverses the endothelium of a blood vessel, and is taken up by the bloodstream. The parasite is then rapidly taken to the liver, where it traverses the sinusoidal endothelium and invades a hepatocyte. Inside the hepatocyte the parasite survives and develops within the parasitophorous vacuole membrane, growing to produce tens of thousands of copies over the course of 2-10 days (depending on species of malaria). The liver stage of infection is undetectable using standard methodologies; infection is not yet diagnosable during this stage since it is asymptomatic and does not result in parasites in the blood that are typically identified by blood smear or rapid diagnostic test in the field. Additionally, the liver stage is the source of non-dividing hypnozoites that, for some species of malaria (*P. vivax, P. ovale*), can lead to relapsing infections weeks, months or even years later. Relapses from activated hypnozoites are thought to contribute to up to 80% of *P. vivax* infections. Two licensed drugs that clear hypnozoites are available, however neither drug can be taken by infants, individuals with G6PD deficiency, or by pregnant or lactating women, leaving a large portion of the population in endemic areas without treatment options.

Only once the parasite exits the liver does it infect erythrocytes, cause symptomatic malaria, and differentiate into sexual stages that are transmitted to the next mosquito. Therefore, eliminating liver stages prevents both disease symptoms and spread. Additionally, parasites that infect the liver but are eliminated during this stage can lead to protective immunity in both mice and humans, making the liver stage a particularly attractive target for intervention. Work in vitro and in animal models has demonstrated the susceptibility of liver stage parasites to drug-based intervention, including host-targeted therapeutics. The developing parasite is particularly vulnerable to perturbations of the host cell environment, on which it relies for nutrients, redox balance, and immune avoidance. A recent study demonstrated the susceptibility of hypnozoites to inhibition of the host transporter aquaporin, indicating that even dormant liver stages may be cleared with host-targeted therapeutics. Models suggest that the elimination of even a portion of hypnozoites could result in a dramatic reduction in malaria cases worldwide.

A number of promising vaccine candidates rely on the production of live malaria sporozoites in mosquitoes. These whole parasite vaccine candidates fall into three categories: radiation attenuated sporozoites (RAS), genetically attenuated parasites (GAP), and chemoprophylaxis with Plasmodium sporozoites (CPS). RAS and CPS use wildtype parasites that are attenuated either prior to administration by radiation (RAS) or after exposure within the human host who has been treated with a drug prior to administration (CPS). GAPs are attenuated by gene knockout. All approaches elicit robust protective immunity in rodents and malaria-naïve humans. While levels of protection in malaria-experienced individuals and with heterologous challenge is somewhat diminished, these approaches appear to elicit a greater level of sterilizing protection against disease and transmission than RTS,S/AS01.

Since sporozoites for research, drug discovery efforts, and vaccine production cannot be robustly produced in vitro, research into liver stage infection depends upon isolation of Plasmodium from infected mosquitoes. Female mosquitoes are infected with Plasmodium during a blood meal from an infected host. After gamete fertilization, the ookinete moves through the midgut epithelium and forms an oocyst on the outer surface. Sporozoites develop within the oocyst and emerge upon oocyst rupture, after which they are carried through the mosquito. Sporozoites selectively bind to and invade the salivary glands where they accumulate and become ready to infect a new host during future blood meals. Once the parasite enters the salivary gland, it is typically hand dissected. After dissection of the salivary glands, sporozoites are released mechanically using a pestle. This technical and inefficient process slows ongoing research and creates a barrier to entry for those considering studying malaria.

Accordingly, a need remains for consistent, facile, and high-throughput processes to effectively process insect host bodies to effectively harvest live parasites for study and potential therapeutic use. The present disclosure addresses these and related needs.

SUMMARY

The present disclosure provides systems, apparatuses, and methods enable rapid, repeatable, and accurate dissection of biological samples such as arthropods.

According to an aspect of the disclosure, arthropod dissection apparatuses includes a shear dissection mechanism having a primary shear body and a secondary shear body. The primary shear body includes at least an inlet channel, a first outlet channel, and a second outlet channel formed therein. The secondary shear body is disposed in an aperture of the primary shear body and has a dissection chamber formed therein. The secondary shear body is movable (e.g., rotatable or translatable) between a first position and a second position relative to the primary shear body, which causes a shearing action at a shearing interface between the secondary shear body and the primary shear body. In the first position, the dissection chamber pneumatically connects the inlet channel to the first outlet channel. In the second position, the dissection chamber pneumatically connects the inlet channel to the second outlet channel. Movement of the secondary shear body from the first position to the second position causes a shearing action at a shearing interface between the secondary shear body and the primary shear body.

In any embodiment, any one or more of the following features may be combined:

- the first outlet channel has a smaller diameter than the dissection chamber
- the first outlet channel has a first diameter and wherein the dissection chamber has a second diameter, wherein the first diameter is 50%-75% of the second diameter
- the first outlet channel has a first diameter and wherein the dissection chamber has a second diameter, wherein the first diameter is 0.50 mm-1.00 mm smaller than the second diameter
- the first outlet channel has a smaller diameter than the second outlet channel
- the first outlet channel and the dissection chamber form the shearing interface, e.g., at a first edge of the dissection chamber and an opposite second edge of the first outlet channel
- the secondary shear body is a cylinder that rotates relative to the primary shear body between the first position and the second position
- the apparatus further includes a vacuum connector pneumatically couplable to the first outlet channel and the second outlet channel
- the shear dissection mechanism is configured such that, when the vacuum connector is pneumatically coupled to a vacuum source and the secondary shear body is in the first position, the vacuum source draws a vacuum through the inlet channel, the dissection chamber, and the first outlet channel
- the shear dissection mechanism is configured such that when the vacuum connector is pneumatically coupled to the vacuum source and the secondary shear body is in the second position, the vacuum source draws the vacuum through an air inlet of the secondary shear body, the dissection chamber, and the second outlet channel
- a first specimen collection tube is pneumatically coupled to the first outlet channel by a first pneumatic tubing, wherein the vacuum connector is pneumatically couplable to the first pneumatic tubing between the first specimen collection tube and the first outlet channel;
- a second specimen collection tube is pneumatically coupled to the second outlet channel by a second pneumatic tubing, wherein the vacuum connector is pneumatically couplable to the second pneumatic tubing between the second specimen collection tube and the second outlet channel
- a wand is pneumatically coupled to the inlet channel of the shear dissection mechanism via a flexible pneumatic tubing
- the flexible pneumatic tubing has a smaller diameter than the inlet channel, and wherein the inlet channel has a smaller diameter than the dissection chamber
- a pressure regulator is pneumatically coupled between the first pneumatic tubing and the second pneumatic tubing
- a drive is operably coupled to move the secondary shear body between the first position and the second position
- an actuator and a controller are operably coupled to the actuator and to the drive, wherein actuation of the actuator sends a signal to the controller, and in response to the signal, the controller sends a second signal to the drive, causing the drive to move the secondary shear body between the second position and the first position
- a display screen is operably connected to the controller
- the controller is programmed with logic, which when executed, stores a number of cycles of the actuator and displays the number of cycles on the display screen According to another aspect, the disclosure provides a grinder which may be made, sold, or used alone or as part of an arthropod processing system which also includes any of the arthropod dissection apparatuses described herein. The grinder includes a pestle assembly having a rotating pestle, and a carriage assembly having a carriage having a test tube aperture configured to hold a test tube, wherein the carriage is configured to move (e.g., translate) relative to the rotating pestle.

In any embodiment, any one or more of the following features may be combined:

- the carriage is configured to translate along a track relative to the pestle
- the grinder further includes a first drive operably coupled to a lead screw configured to translate the carriage along the track
- the grinder further includes a second drive configured to rotate the pestle
- the grinder further includes a second controller operably coupled to the pestle assembly and the carriage assembly, wherein the second controller includes logic, which when executed, advances the carriage toward the pestle and rotates the pestle a predetermined number of grinds based upon an input from a user input device According to another aspect of the disclosure, arthropod dissection methods include moving the arthropod into a dissection chamber, moving the arthropod partially through a constriction between the dissection chamber and an outlet channel connected to the dissection chamber such that a larger diameter portion of the arthropod is held in the dissection chamber by the constriction and a smaller diameter portion of the arthropod is disposed in the outlet channel, and shearing the larger diameter portion of the arthropod from the smaller diameter portion of the arthropod by moving the dissection chamber relative to the outlet channel.

In any embodiment, any one or more of the following method steps may be combined in any order:

- evacuating the larger diameter portion of the arthropod through a second outlet channel
- evacuating the smaller diameter portion of the arthropod through the first outlet channel
- moving the dissection chamber relative to the outlet channel includes rotating the dissection chamber relative to the outlet channel moving the arthropod into the dissection chamber includes drawing the arthropod into the dissection chamber using a vacuum source moving the arthropod partially through the constriction includes drawing the arthropod partially through the constriction using the vacuum source grinding the larger diameter portion of the arthropod

BRIEF DESCRIPTION OF THE SEVERAL VIEWS OF THE DRAWINGS

The foregoing aspects and many of the attendant advantages of the claimed subject matter will become more readily appreciated by reference to the following detailed description, when taken in conjunction with the accompanying drawings, wherein:

DETAILED DESCRIPTION

The present disclosure provides systems, apparatuses, and methods which enable semi-automated dissection of biological samples, including arthropods such as mosquitos. Throughout this disclosure, the inventive systems, apparatuses, and methods are described in the representative context of mosquito dissection and malaria research in order to facilitate understanding. In this context, mosquito dissection enables isolation of *Plasmodium yoelii* sporozoites. The systems, apparatuses, and methods described herein will be useful to labs studying a wide range of biological samples, for example, laboratories studying malaria and/or producing whole parasite malaria vaccines derived from mosquitoes.

It shall be appreciated that while the following Detailed Description describes the systems, apparatuses, and methods in the context of mosquitos and malaria, the same are useful for dissecting biological samples generally, and are not limited to the specific application to mosquitos and malaria research, or even to arthropods generally.

As used herein, alike terms used with respect to different embodiments have alike meanings. Further still, features of any of the embodiments described herein may be combined with any one or more other features to form additional embodiments within the scope of the present disclosure.

Figure 1A:
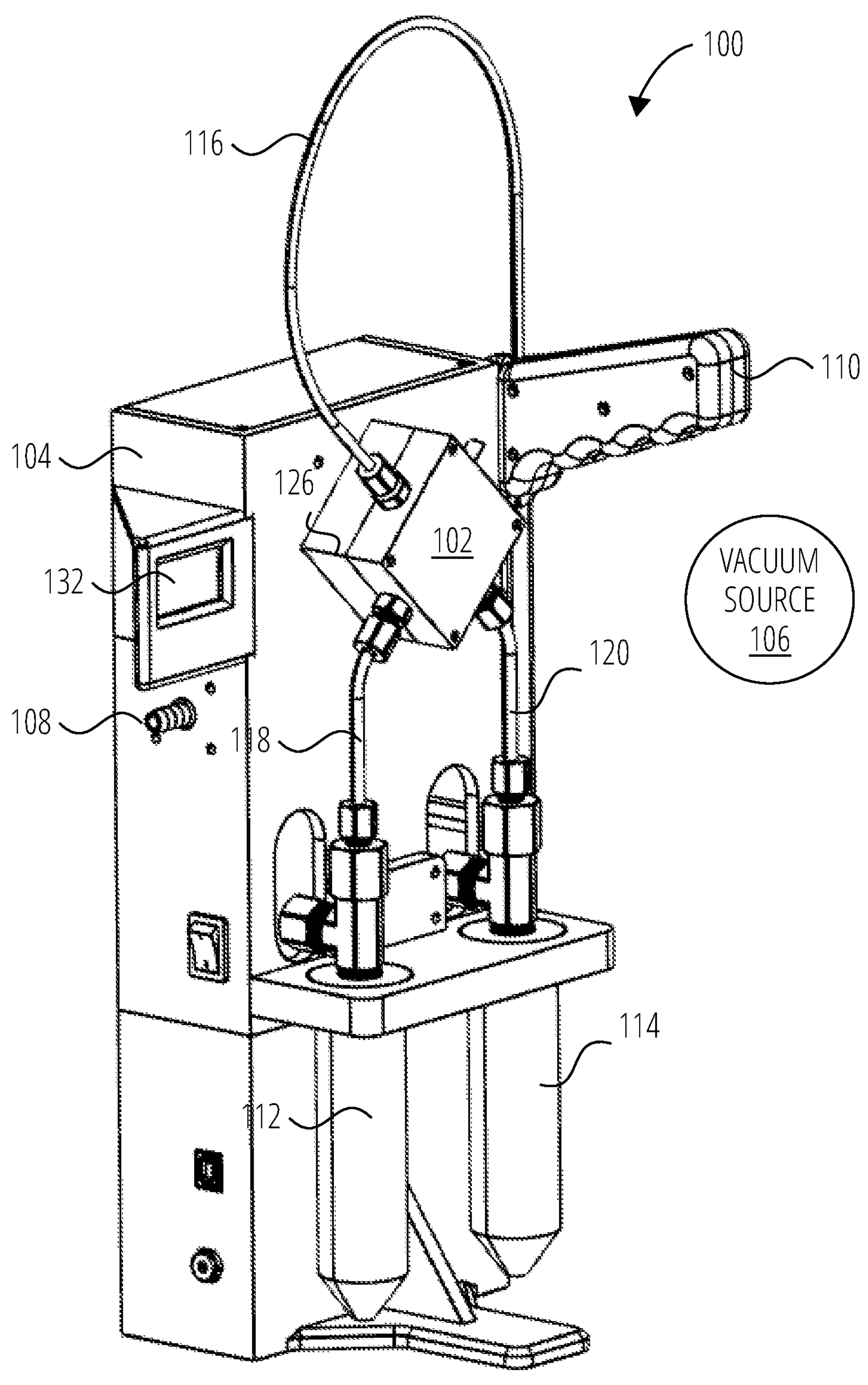
FIG. 1A shows a front left perspective view of an arthropod dissection apparatus according to a representative embodiment of the present disclosure.
Figure 1B:
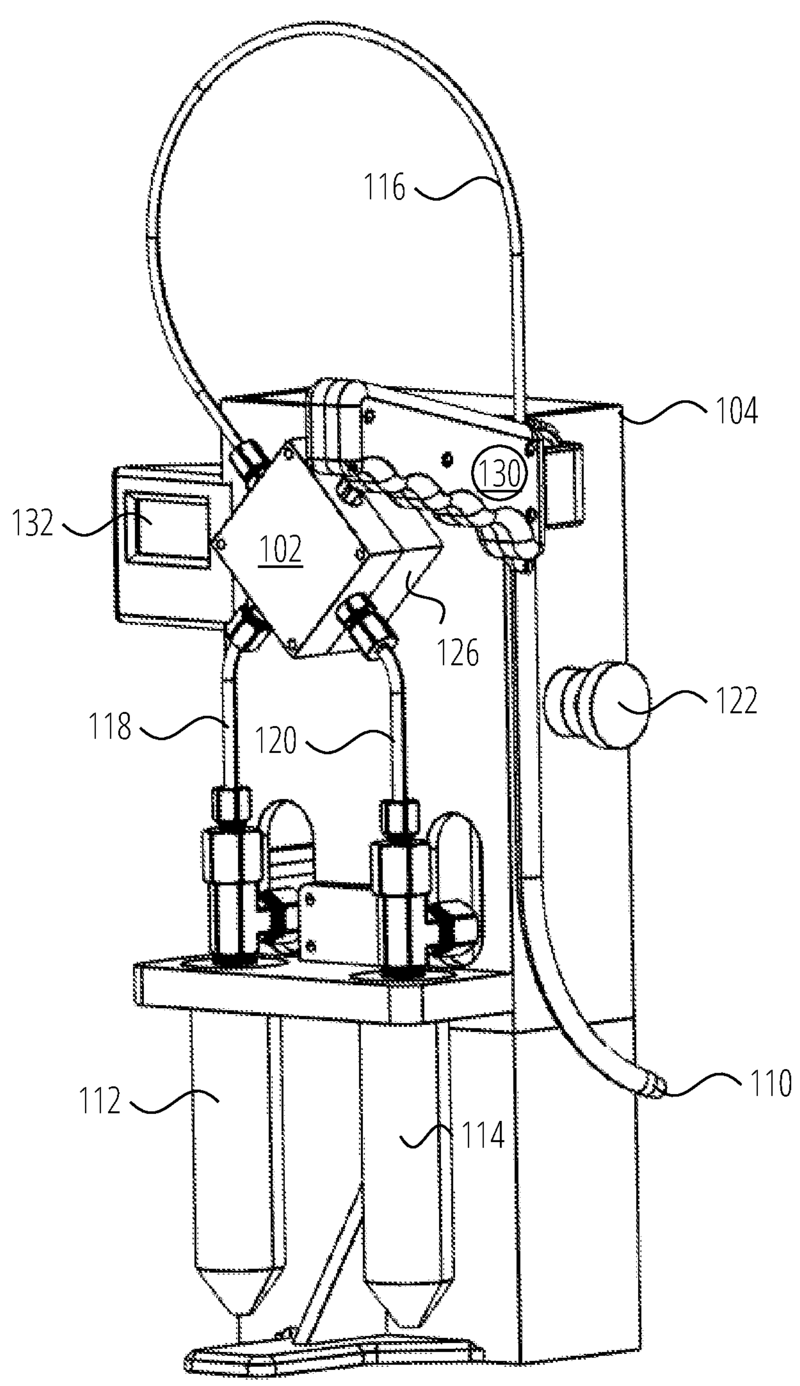
FIG. 1B shows a front right perspective view of the arthropod dissection apparatus of FIG. 1A.

FIG. 1A-FIG. 1B show a biological sample dissection apparatus (here, an arthropod dissection apparatus 100) according to a representative embodiment of the present disclosure. Generally, the arthropod dissection apparatus 100 is a pneumatic device embodying a shear dissection mechanism which enables rapid and accurate dissection of arthropods, for example rapid, facile, repeatable, and accurate separation of the head and thorax from the abdomen of an arthropod. For the purposes of malaria research, mosquito salivary glands (located in a mosquito's head) contain the infectious parasites that, when attenuated, can induce protective immunity in mice and humans, whereas the midgut (located in a mosquito's abdomen) contains non-infectious parasites that are not protective when administered as a vaccine. Thus, separation of the head from the abdomen facilitates malaria research.

To facilitate understanding of the present disclosure, the user will appreciate that a mosquito body includes three roughly distinct parts, in order from front to rear: the head, the thorax, and the abdomen. The systems, apparatuses, and methods of the present disclosure exploit the fact that for mosquitos which carry malaria (namely the *Anopheles stephensi* mosquito), the thorax is generally larger than the abdomen. Certain representative embodiments described herein provide structural dimensions which correspond to dimensions of female *Anopheles stephensi* mosquitoes. However, it shall be appreciated that the present disclosure is not limited to embodiments having the specific dimensions provided. Indeed, other embodiments of the present disclosure have different dimensions.

Turning now to FIG. 1A, an overview of the arthropod dissection apparatus 100 will be provided. The arthropod dissection apparatus 100 dissects arthropods using a shear dissection mechanism 102. Representative shear dissection mechanisms are described below in detail, and introduced generally here to facilitate understanding of the overall apparatus. The shear dissection mechanism 102 is disposed upon a protective housing 104 which also supports additional elements of the arthropod dissection apparatus 100. Although the protective housing 104 has an "upright" or vertical configuration in the representative embodiment shown, other embodiments have a horizontal or other configuration.

The shear dissection mechanism 102 is pneumatically couplable to a vacuum source 106 which provides the motive force to introduce arthropods into the arthropod dissection apparatus 100 and to evacuate portions of the dissected arthropods into separate containers. In the embodiment shown, the vacuum source 106 is not part of the arthropod dissection apparatus 100, such as when the vacuum source 106 is a laboratory vacuum source. Accordingly, a vacuum connector 108 (a fitting) enables pneumatic connection of the arthropod dissection apparatus 100 to the external vacuum source 106. In some embodiments, the arthropod dissection apparatus 100 includes an on-board vacuum source disposed in the protective housing 104, for greater versatility. The pneumatic operation of the shear dissection mechanism 102 is detailed below with respect to FIG. 2A and FIG. 2B.

Shear dissection mechanism 102 is also pneumatically connected to a wand 110 having pneumatic tubing disposed therein and being configured to suck arthropods into the arthropod dissection apparatus 100 under the motive force of the vacuum source 106, a first specimen collection tube 112 for collecting a first part of dissected arthropods (e.g., the abdomens), and a second specimen collection tube 114 for collecting a second part of dissected arthropods (e.g., the heads and thoraxes). In some embodiments, each of the first specimen collection tube 112 and second specimen collection tube 114 are disposed gravitationally below the shear dissection mechanism 102, which advantageously facilitates capture of the dissected arthropod.

Figures 2A, 2B:
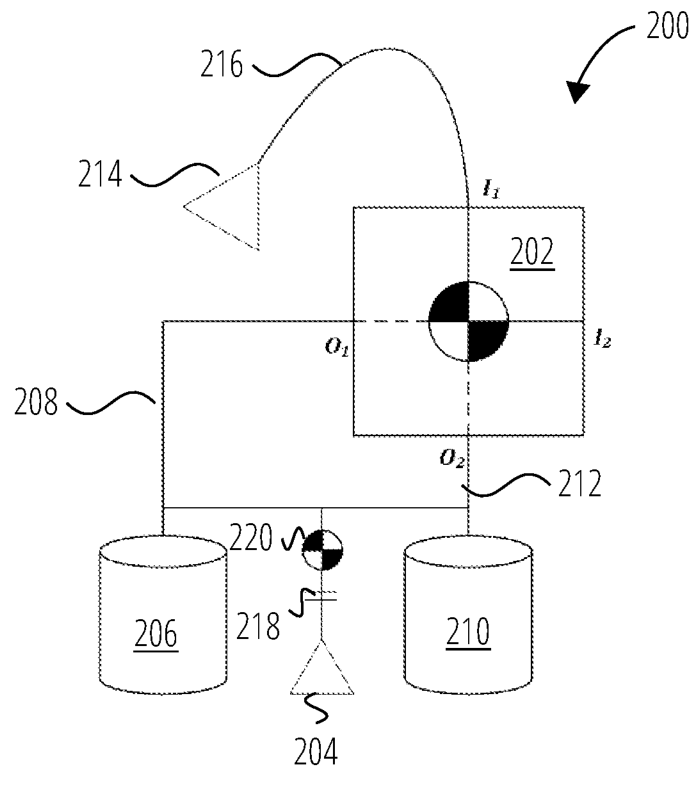
FIG. 2A shows a schematic pneumatic diagram of an arthropod dissection apparatus according to a representative embodiment of the present disclosure.
FIG. 2B shows a schematic pneumatic diagram of a shear dissection mechanism of the arthropod dissection apparatus of FIG. 2A.

The wand 110 is pneumatically connected to the shear dissection mechanism 102 by flexible pneumatic tubing 116 such as TEFLON® tubing or the like. First specimen collection tube 112 and second specimen collection tube 114 are respectively coupled to shear dissection mechanism 102 by pneumatic tubing 118 and pneumatic tubing 120, which can be flexible tubing or rigid tubing such as copper or the like. FIG. 2A and FIG. 2B provide details of the pneumatic connection of the foregoing elements.

A pressure regulator 122 enables adjustment of a vacuum pressure in the system. For example, In some embodiments, pressure regulator 122 enables adjustment between 65-101 kpa (for example 84-86 kpa) in the first specimen collection tube 112, which has been determined to be ideal for facile dissection.

Figure 1C:
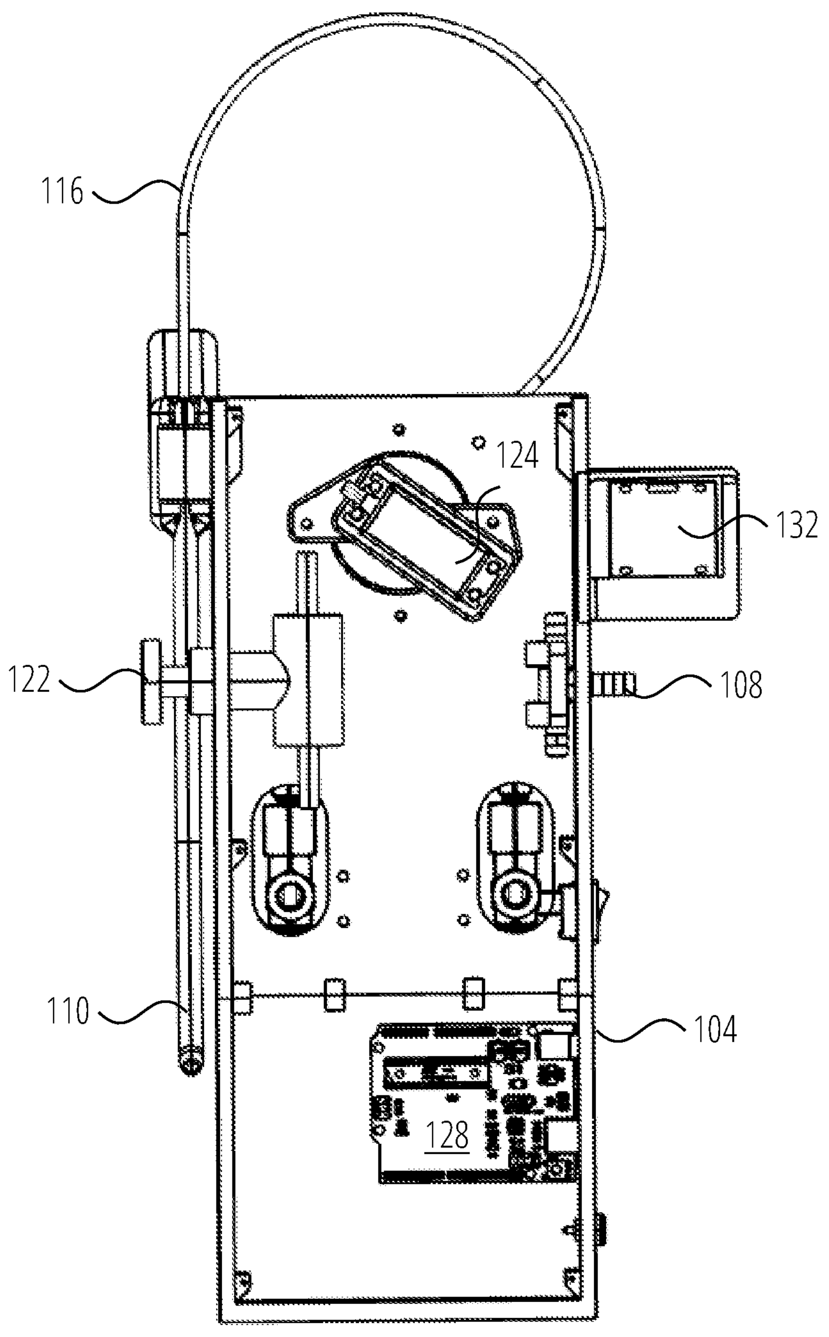
FIG. 1C shows a rear view of the arthropod dissection apparatus of FIG. 1A, with a portion of a protective housing thereof hidden.

Referring to FIG. 1C, shear dissection mechanism 102 is operably coupled with an electrical, pneumatic, or similar drive (in this case, servo 124) via a shear mechanism coupling 126, e.g., a shaft that couples the servo 124 to a secondary shear body of the shear dissection mechanism 102 as described below. The servo 124 repeatedly moves the shear dissection mechanism 102 between a first position and a second position as described below. In particular, the servo 124 moves the secondary shear body relative to a primary shear body. In some embodiments, the shear mechanism coupling 126 operably couples the servo 124 to the primary shear body of the shear dissection mechanism 102, rather than the secondary shear body.

Servo 124 is operably coupled to a controller 128, e.g., an Arduino microcontroller having a processor and a data store disposed thereon. The controller 128 is, in turn, electrically and/or pneumatically connected to an actuator 130 (e.g., a button) disposed on the wand 110 (such as on an optional handle of the wand 110). The memory store of the controller 128 is programmed with logic which, when executed by actuation of the actuator 130, cause the servo 124 to move the shear dissection mechanism 102 to the first position, which in turn causes a vacuum to be drawn through the wand 110 and through the shear dissection mechanism 102.

Optionally, controller 128 is operably coupled to a display screen 132 (e.g., an LCD or LED display screen) disposed on the protective housing 104. In some embodiments, the data store of the controller 128 is programmed with logic, which when executed, stores a number of cycles of the shear dissection mechanism 102 (as determined by the number of time the actuator 130 is actuated), and causes the display screen 132 to display one or more parameters relating to the arthropod dissection apparatus 100, for example the stored number of cycles of the shear dissection mechanism 102 (a proxy for how many arthropods have been dissected).

In use, the arthropod dissection apparatus 100 is connected to the vacuum source 106. A user maneuvers and positions the wand 110 behind an arthropod (for example, behind the abdomen of a mosquito). After the wand 110 is positioned, the user actuates the actuator 130 (for example, presses the button on the wand), which sends a signal to the controller 128; in response to the signal, controller 128 sends a signal to the servo 124 causing the servo 124 to rotate the shear dissection mechanism 102 to a first position. This, in turn, causes the vacuum source 106 to draw a vacuum through the wand 110 and through the shear dissection mechanism 102. Because of the placement of the wand 110 behind the arthropod, the vacuum sucks the arthropod into the wand 110, through the flexible pneumatic tubing 116, and into the shear dissection mechanism 102 (in particular, into a dissection chamber thereof).

After the servo 124 has rotated the shear dissection mechanism 102 into the first position and caused the arthropod to be sucked into the shear dissection mechanism 102 (for example, after a predetermined passage of time in the first position of about 0.5 seconds-1.0 second), the servo 124 causes the shear dissection mechanism 102 to move back into the second position by rotating the secondary shear body relative to the primary shear body.

As described below with respect to FIG. 5A-FIG. 5D, when an arthropod is disposed within a dissection chamber of the shear dissection mechanism 102, movement of the shear dissection mechanism 102 between the first position and the second position bifurcates the arthropod into two parts, which are respectively sucked into the first specimen collection tube 112 and second specimen collection tube 114 under operation of the vacuum source 106. The selective capture enables rapid separation of the head and thorax of the arthropod from the abdomen.

The user can repeat the foregoing process in order to efficiently dissect a large number of arthropods (see FIG. 7), which number is displayed on the optional display screen 132.

FIG. 2A shows a schematic vacuum diagram of an arthropod dissection apparatus 200 which has the features of the arthropod dissection apparatus 100 described above. In particular, arthropod dissection apparatus 200 includes a shear dissection mechanism 202 which is pneumatically connected to a vacuum source 204, a first specimen collection tube 206 (via pneumatic tubing 208), a second specimen collection tube 210 (via pneumatic tubing 212), and a wand 214 (via flexible pneumatic tubing 216).

Shear dissection mechanism 202 includes at least two air inlet channels: a first inlet channel (I1) and a second inlet channel (I2), and two air outlet channels: a first outlet channel (O1) and a second outlet channel (O2). I1 is pneumatically connected with wand 214. I2 is an ambient air inlet. O1 is pneumatically connected to the first specimen collection tube 206. O2 is pneumatically connected to the second specimen collection tube 210.

As shown, vacuum source 204 pneumatically connects with the arthropod dissection apparatus 200 at vacuum connector 218, from which two pneumatic branches split: a first branch connecting vacuum connector 218 to a location between O1 and the first specimen collection tube 206 (i.e., in line with pneumatic tubing 208), and a second branch connecting vacuum connector 218 to a second location between O2 and second specimen collection tube 210 (i.e., in line with pneumatic tubing 212). A pressure regulator 220 is pneumatically coupled between the pneumatic tubing 208 and pneumatic tubing 212. Thus, the vacuum source 204 tends to draw matter first into I1 or I2 and then into O1 or O2, depending on the position of the shear dissection mechanism 202 as described below. Matter passing through O1 and O2 is directed to first specimen collection tube 206 and second specimen collection tube 210, respectively.

Referring to FIG. 2B, shear dissection mechanism 202 is a pneumatic valve having at least two positions. In a first position, I1 and O1 pneumatically connect, whereas I2 and O2 are closed. In a second position, I2 and O2 pneumatically connect, whereas I1 and O1 are closed.

Thus, in the first position, arthropods are first drawn into the wand 214 and then into the shear dissection mechanism 202 via I1. Matter in the shear dissection mechanism 202 is drawn toward the first specimen collection tube 206. However, as explained below, a structural constriction in the shear dissection mechanism 202 restricts passage of a portion the arthropod.

In the second position, ambient air is drawn into the shear dissection mechanism 202 via I2 and out via O2. Thus, matter in the shear dissection mechanism 202 is drawn toward the second specimen collection tube 210.

Figure 3:
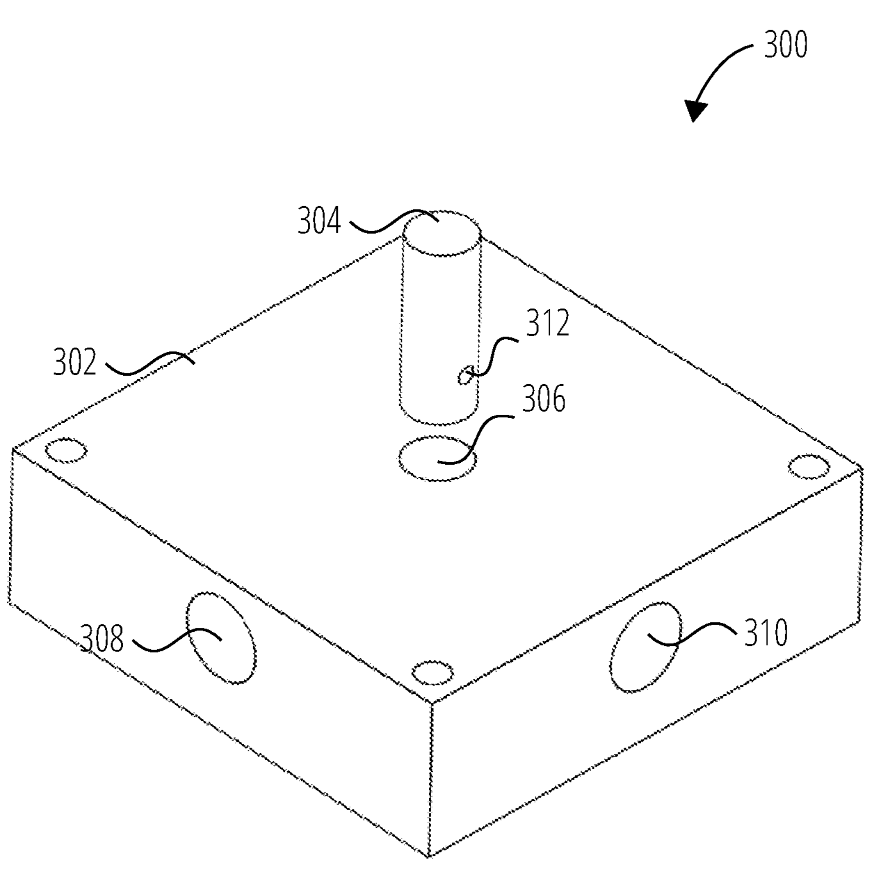
FIG. 3 shows an exploded view of a shear dissection mechanism according to a representative embodiment of the present disclosure.

FIG. 3 shows an exploded perspective view of a shear dissection mechanism 300 having the same features as the previously-discussed shear dissection mechanisms.

Generally speaking, shear dissection mechanism 300 includes a primary shear body 302 and a secondary shear body 304 which are configured to move relative to one another. In the illustrated embodiment, shear dissection mechanism 300 is a rotational shear mechanism, i.e., the relative rotational movement of the primary shear body 302 and secondary shear body 304 creates a shearing action. In other embodiments, the shear dissection mechanism is a translational shear mechanism, i.e., the translational movement of the primary shear body and secondary shear body creates the shearing action. In such translational shear embodiments, the secondary shear body is not limited to cylindrical shapes.

In some embodiments, primary shear body 302 and secondary shear body 304 are each formed of a machinable metal such as stainless steel, aluminum, or the like. In other embodiments, primary shear body 302 and/or secondary shear body 304 is an additively manufactured body formed of a polymer (for example, PLA).

Primary shear body 302 has an aperture 306 therethrough which is sized to receive the secondary shear body 304 therein, such that the secondary shear body 304 can rotate relative to primary shear body 302 (e.g., when the secondary shear body 304 is rotated by a servo). The fit between the primary shear body 302 and secondary shear body 304 should have a precise fit which enables the secondary shear body 304 to rotate. While the secondary shear body 304 is configured to rotate, the clearance between the primary shear body 302 and the secondary shear body 304 should be tight (e.g., 0.25 MM or less, because the relative movement creates a precise shearing action which dissects arthropods, as described below and illustrated in FIG. 5A-FIG. 5D.

The aperture 306 is in pneumatic communication with a plurality of channels also formed in the primary shear body 302 and described below, including a plurality of air inlet channels (not shown) and a plurality of outlet channels 308, 310.

Secondary shear body 304 is a cylinder with a dissection chamber 312 (i.e., a cylindrical bore) formed therethrough at a location such that the dissection chamber 312 is selectively pneumatically couplable to the plurality of channels formed in the primary shear body 302.

Figure 4A:
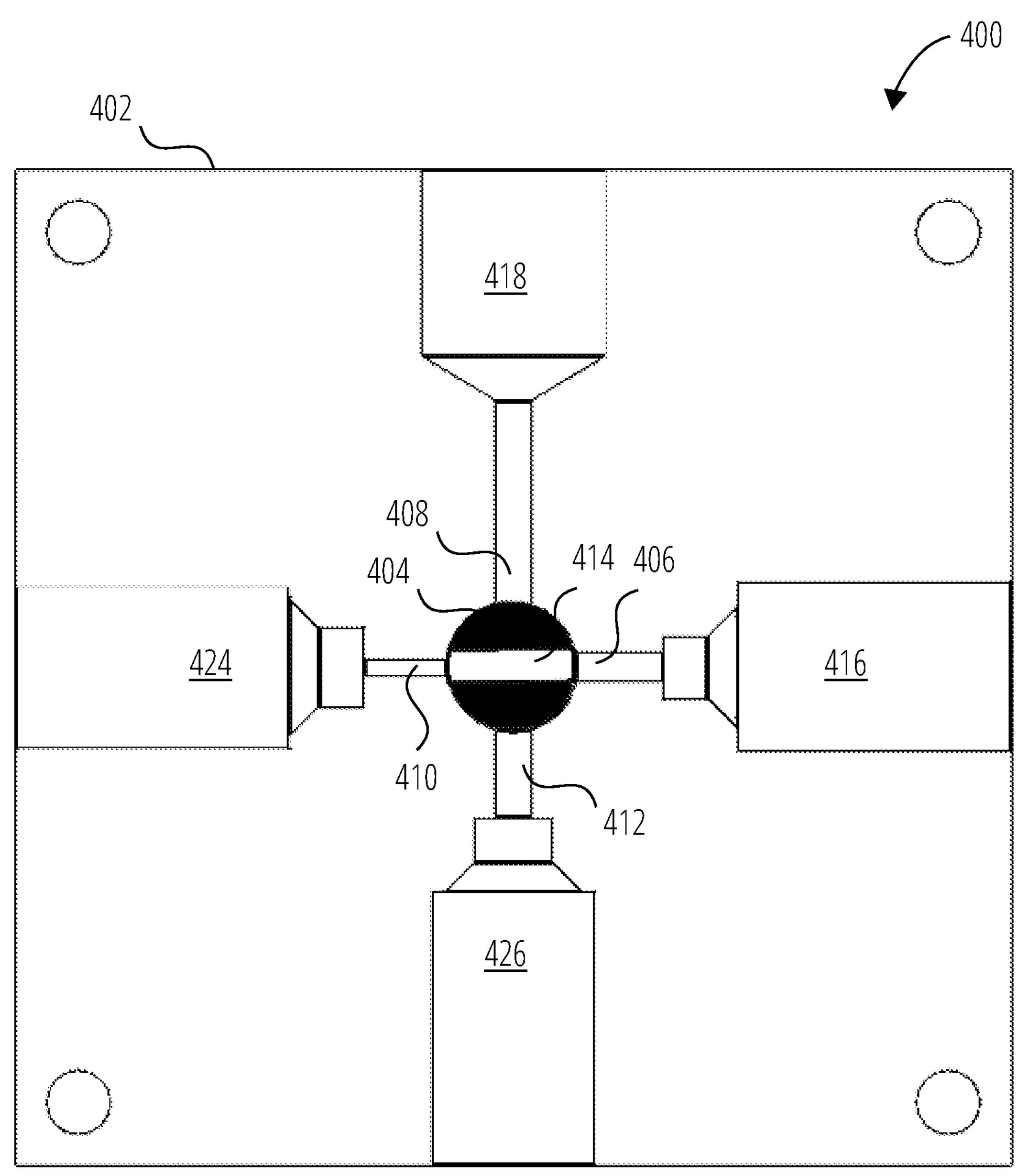
FIG. 4A shows a top section view of a shear dissection mechanism in a first position according to a representative embodiment of the present disclosure.
Figure 4B:
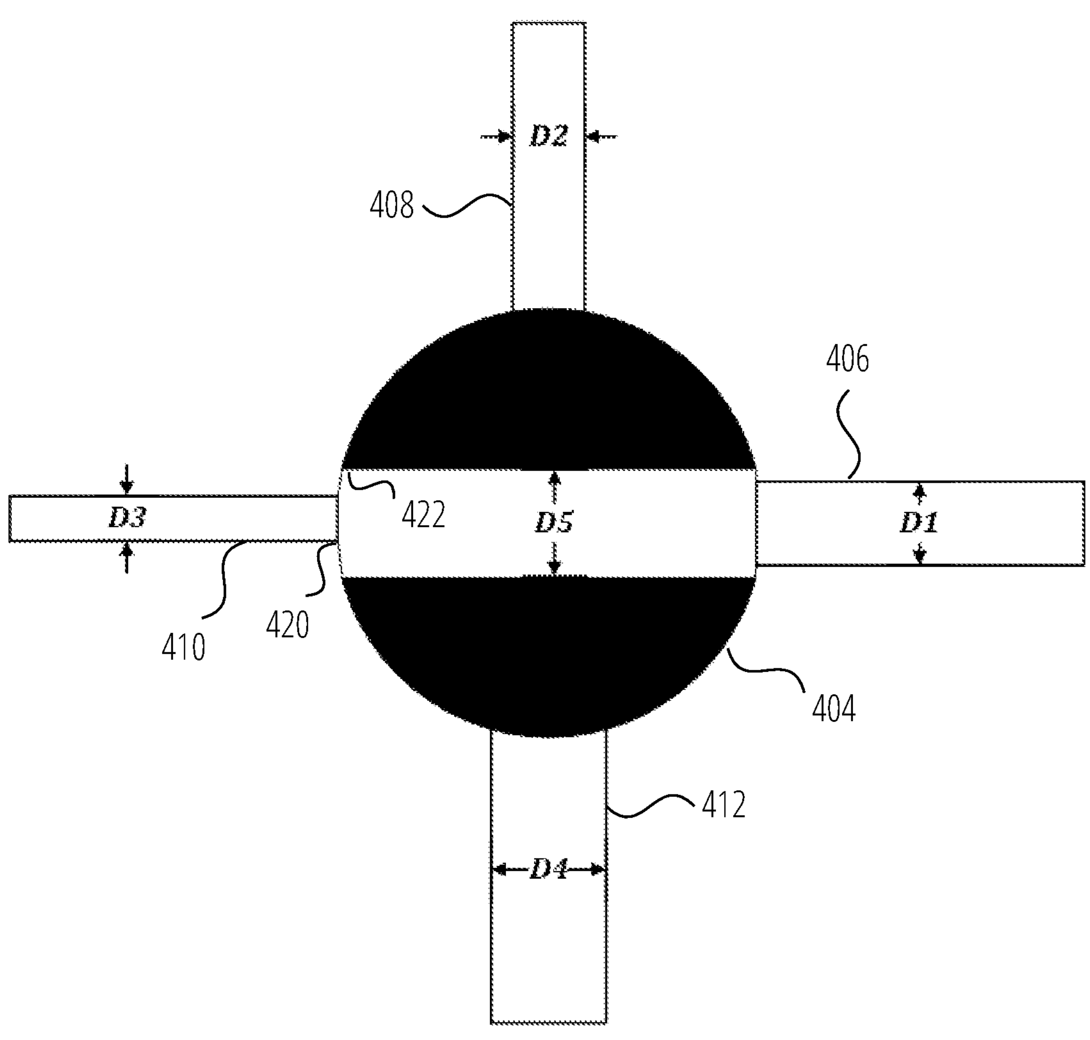
FIG. 4B shows a detail top section view of a portion of the shear dissection mechanism of FIG. 4A in a first position.
Figure 4C:
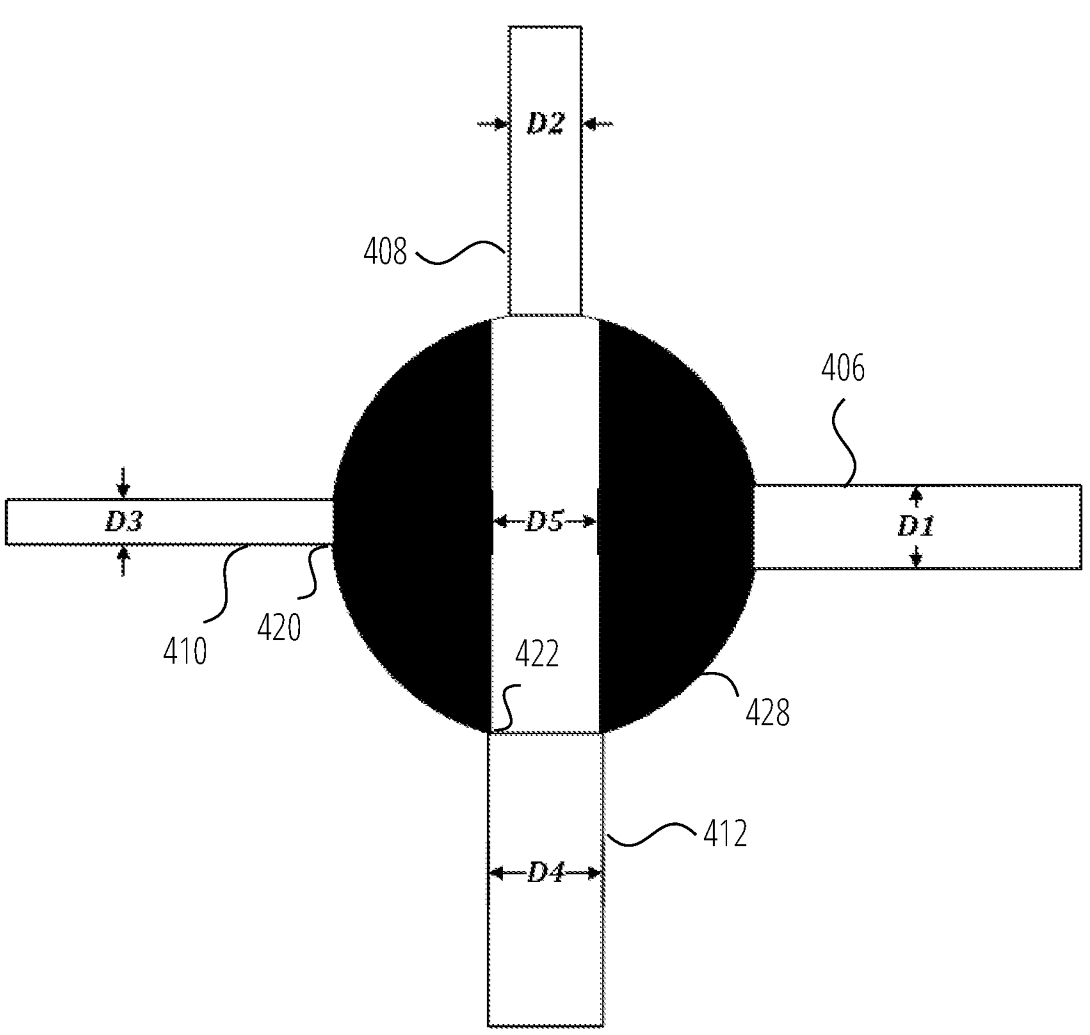
FIG. 4C shows a detail top section view of a portion of the shear dissection mechanism of FIG. 4A in a second position.

FIG. 4A-FIG. 4C show schematic section views of a shear dissection mechanism 400 having the same construction as the shear dissection mechanism 300 of FIG. 3. In particular, the section plane of FIG. 4A-FIG. 4C is analogous to a plan passing through a center of outlet channels 308 and 310 of FIG. 3. FIG. 4A and FIG. 4B show the shear dissection mechanism 400 in a first position, whereas FIG. 4C shows the shear dissection mechanism 400 in a second position.

Referring first to FIG. 4A in connection with FIG. 4B, shear dissection mechanism 400 includes a primary shear body 402 and a cylindrical secondary shear body 404 fitted into an aperture of the primary shear body 402. Primary shear body 402 includes a first inlet channel 406 (having a first diameter D1), a second inlet channel 408 (having a second diameter D2), a first outlet channel 410 (having a third diameter D3), and a second outlet channel 412 (having a fourth diameter D4) formed therein, which all meet at the aperture in which the secondary shear body 404 is fitted. Secondary shear body 404 includes a dissection chamber 414 (a cylindrical bore having a fifth diameter D5) formed therethrough at a position along the secondary shear body 404 such that the dissection chamber 414 selectively communicates with the channels 406, 408, 410, 412 when the secondary shear body 404 is rotated relative to primary shear body 402.

In the first position shown in FIG. 4A and FIG. 4B, the dissection chamber 414 pneumatically connects the first inlet channel 406 to the first outlet channel 410. In the second position shown in FIG. 4C, the dissection chamber 414 pneumatically connects the second inlet channel 408 to the second outlet channel 412.

First inlet channel 406 is the channel through which arthropods are introduced into the shear dissection mechanism 400. To facilitate this function, first inlet channel 406 is in fluid connection with a first inlet tube bore 416 configured to receive pneumatic tubing (namely, the pneumatic tubing coupled with a wand, through which arthropods are sucked into the apparatus). The first diameter D1 is therefore sufficiently large to allow an arthropod to pass therethrough into the dissection chamber 414, while simultaneously small enough to maintain sufficient airflow to pull arthropods through the shear dissection mechanism 400 under the force provided by a vacuum source when the shear dissection mechanism 400 is in the first position. The first diameter D1 is generally between 1.00 mm-3.00 mm. In some embodiments, the first diameter D1 is between 1.50 mm-1.60 mm, for example 1.5875 mm; these dimensions have been determined to enable female *Anopheles stephensi* mosquitoes to pass through the first inlet channel 406 while maintaining sufficient airflow. In some embodiments, D1 is the same size or smaller than both D4 and D5, such that the arthropods being processed by the shear dissection mechanism 400 are not damaged by constrictions in the pneumatic flow path.

Second inlet channel 408 is an air inlet through which ambient air is introduced when the shear dissection mechanism 400 is in the second position (shown in FIG. 4C), in order to enable a portion of the dissected arthropod to be sucked through the second outlet channel 412 (and ultimately into the second specimen collection tube). Second inlet channel 408 is in fluid connection with an ambient air inlet bore 418, which may be sized to receive optional pneumatic tubing. Second diameter D2 is configured to maintain sufficient airflow to pull arthropods through the shear dissection mechanism 400 under the force provided by the vacuum source when the shear dissection mechanism 400 is in the second position. In some embodiments, second diameter D2 is between 1.00 mm-2.00 mm, for example 1.50 mm-1.75 mm (for example 1.5875 mm).

First outlet channel 410 is the channel through which a smaller-diameter portion of an arthropod is evacuated following dissection. Further, the constriction caused by dimensional differences between the first outlet channel 410 and the dissection chamber 414 holds the arthropod in place during dissection. In particular, this constriction enables a smaller-diameter portion of the arthropod (such as the abdomen) to be held within the first outlet channel 410, while a larger-diameter portion of the arthropod (such as the thorax and head) is held within the dissection chamber 414. Restated, first outlet channel 410 has a diameter that is at least as large as the arthropod's abdomen, but smaller than the arthropod's thorax. Further still, as shown in FIG. 4B, a first shearing edge 420 of the first outlet channel 410 forms a shearing interface with second shearing edge 422 of the dissection chamber 414 as the dissection chamber 414 moves from the first position to the second position. This shearing action at the shearing interface dissects the arthropod. Accordingly, the third diameter D3 is important for correct and efficient dissection. The third diameter D3 is generally between 0.50 mm-1.50 mm, and is generally smaller than the fifth diameter D5 of the dissection chamber 414 in order to create the appropriate constriction. In some embodiments, the third diameter D3 is between 0.50 mm-1.00 mm smaller than the fifth diameter D5, for example 0.60 mm-0.70 mm smaller (for example 0.6375 mm smaller). In some embodiments, the third diameter D3 is 50%-75% of the fifth diameter D5, for example 55%-65% (for example 60%). In some embodiments, the third diameter D3 is between 0.90 mm-1.00 mm, for example 0.95 mm. The foregoing D3 dimensions and relationships to D5 have been determined to consistently trap female *Anopheles stephensi* mosquitoes by creating a constriction between the first outlet channel 410 and dissection chamber 414, while allowing smaller non-infectious male mosquitoes to pass through the first outlet channel 410 without being dissected. To enable evacuation of a smaller-diameter dissected portion of the arthropod (such as the abdomen), the first outlet channel 410 is in fluid connection with a first outlet tube bore 424 configured to receive pneumatic tubing (such as the pneumatic tubing connected to the first specimen collection tube).

Second outlet channel 412 is the channel through which a larger-diameter portion of an arthropod (for example a thorax) is evacuated following dissection. Accordingly, the fourth diameter D4 is generally at least as large as the fifth diameter D5 of the dissection chamber 414. Generally, the fourth diameter D4 is between 1.00 mm-3.00 mm. In some embodiments, the fourth diameter D4 is between 1.50 mm-1.60 mm, for example 1.5875 mm; these dimensions have been determined to allow female *Anopheles stephensi* mosquitoes to pass through the second outlet channel 412 while maintaining sufficient airflow. In some embodiments, the fourth diameter D4 is at least 0.01 mm larger than the fifth diameter D5, for example 0.01 mm-0.05 mm larger. This prevents passing arthropods from being damaged by constrictions in the flow path between the dissection chamber 414 and second outlet channel 412. To enable evacuation of a larger-diameter dissected portion of the arthropod (such as the thorax and head), second outlet channel 412 is in fluid connection with a second outlet tube bore 426 configured to receive pneumatic tubing (such as the pneumatic tubing connected to the second specimen collection tube).

Dissection chamber 414 holds a portion of the arthropod during the dissection (in particular the thorax and head), and transports a dissected portion of the arthropod (again, the thorax and head) to the second outlet channel 412 following the dissection for evacuation to the second specimen collection tube. Further, the constriction caused by dimensional differences between the first outlet channel 410 and the dissection chamber 414 holds the arthropod in place during dissection. In particular, this constriction enables a smaller-diameter portion of the arthropod (such as the abdomen) to be held within the first outlet channel 410, while a larger-diameter portion of the arthropod (such as the thorax and head) is held within the dissection chamber 414. Further still, a second shearing edge 422 of the dissection chamber 414 forms a shearing action along with first shearing edge 420 of the first outlet channel 410 as the dissection chamber 414 moves from the first position to the second position. This shearing action dissects the arthropod. Accordingly, the fifth diameter D5 is important for correct and efficient dissection. Like the first diameter D1 of the first inlet channel 406, the fifth diameter D5 of the dissection chamber 414 is sufficiently large to accommodate the largest-diameter portion of the to-be-dissected arthropod. At the same time, the fifth diameter D5 is small enough to maintain sufficient airflow to pull arthropods through the shear dissection mechanism 400 under the force provided by a vacuum source. The fifth diameter D5 is larger than the third diameter D3, which creates the constriction that traps a first portion of the arthropod in the first outlet channel 410 and a second portion of the arthropod in the dissection chamber 414. But for the dimensional difference between D3 and D5, the entire arthropod would pass into the first outlet channel 410 (and subsequently into the first specimen collection tube). Generally, the fifth diameter D5 is between 1.00 mm-3.00 mm. In some embodiments, the fifth diameter D5 is between 1.50 mm-1.60 mm, for example 1.5875 mm. In some embodiments, the fifth diameter D5 is 0.50 mm-1.00 mm larger than the third diameter D3, for example 0.60 mm-0.70 mm larger (for example, 0.6375 mm larger). In some embodiments, the fifth diameter D5 is 50%-100% larger than the third diameter D3, for example 65%-75% larger (for example 67% larger). The foregoing dimensions and dimensional relationships have been determined to effectively retain a larger-diameter portion of female *Anopheles stephensi* mosquitoes in the dissection chamber 414 during dissection while allowing sufficient airflow to pass therethrough, such that the dissected portion can be evacuated from the dissection chamber 414. Generally, the fifth diameter D5 is at least as large as the first diameter D1 of first inlet channel 406, in order to prevent any structural constriction between the first inlet channel 406 and dissection chamber 414 which would damage the arthropods prior to dissection. In some embodiments, the fifth diameter D5 is at least 0.01 mm larger than the first diameter D1, for example 0.01 mm-0.05 mm larger.

In any of the foregoing aspects of the shear dissection mechanism 400, an optional chamfered interface between the channels and the corresponding tube bores facilitates insertion of the corresponding pneumatic tubing.

As will be described below, the relative diameters of the dissection chamber 414 and channels 406, 410, and 412, coupled with the shearing action created when the dissection chamber 414 rotates relative to the primary shear body 402, enable the shear dissection mechanism 400 to repeatedly and accurately dissect arthropods.

Figure 5A:
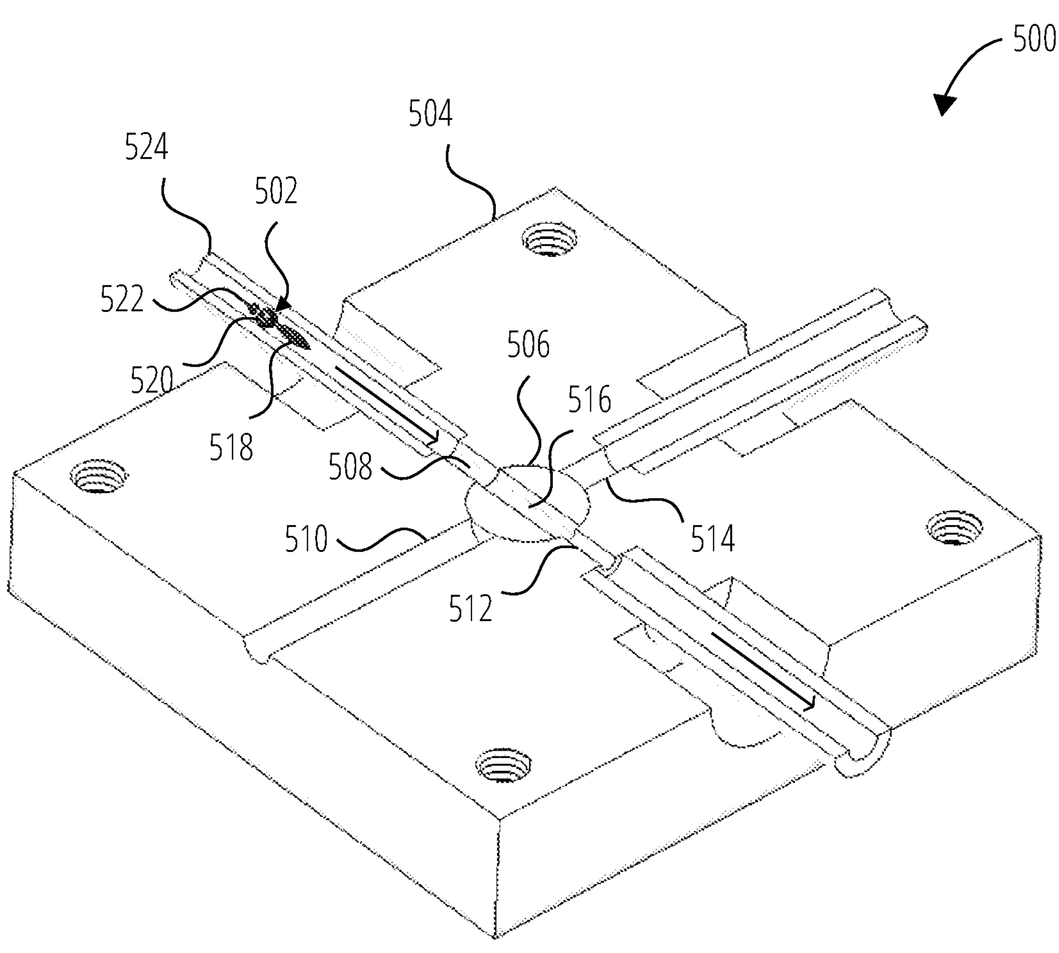
FIG. 5A-FIG. 5D show a method of dissecting an arthropod with a shear dissection mechanism according to a representative embodiment of the present disclosure.
Figure 5B:
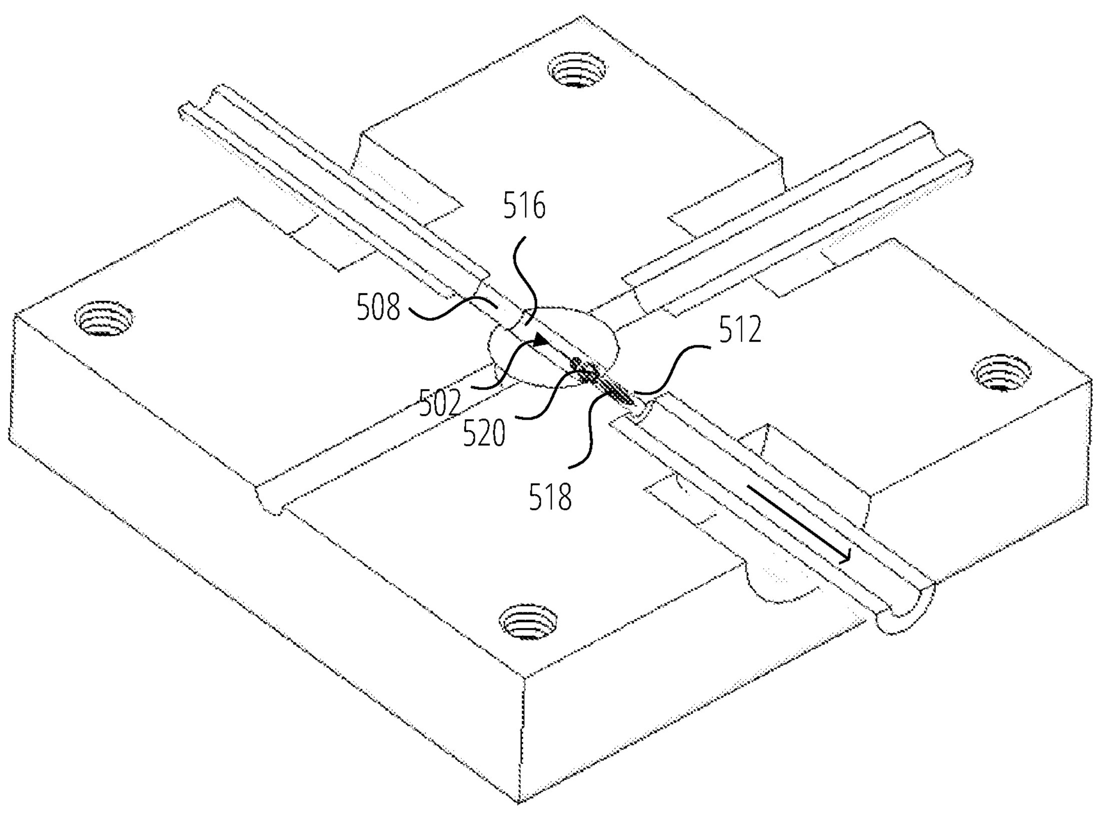
Figure 5C:
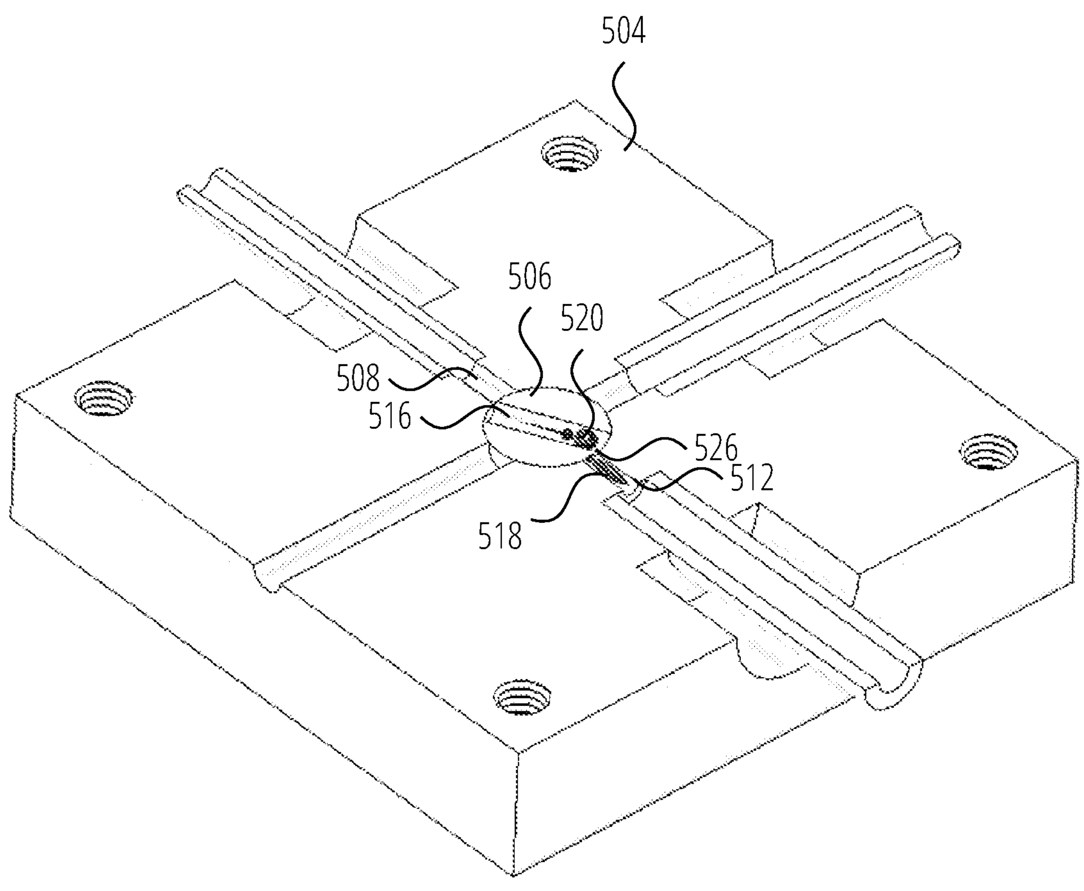
Figure 5D:
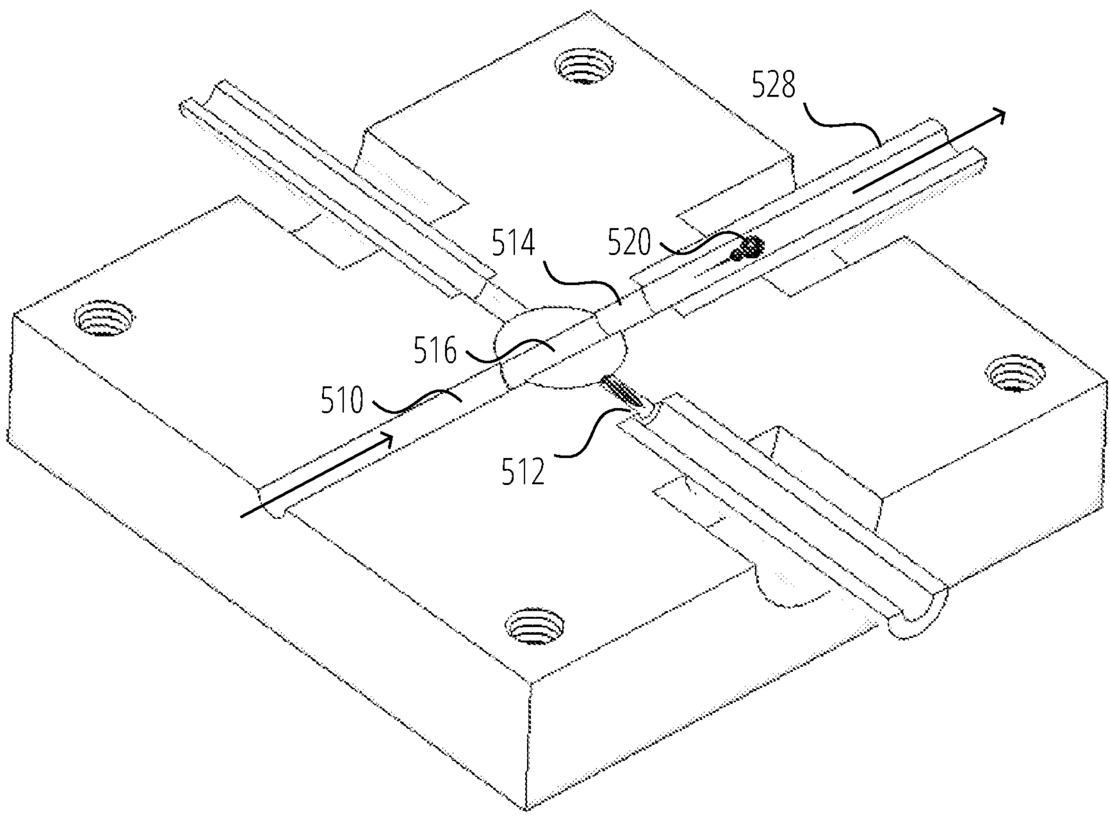

FIG. 5A-FIG. 5D illustrate a shear dissection mechanism 500 dissecting an arthropod 502, and also illustrate a representative method of dissecting arthropods according to an embodiment of the present disclosure. In particular, FIG. 5A and FIG. 5B show the shear dissection mechanism 500 in a first position. FIG. 5C shows the shear dissection mechanism 500 moving between the first position and a second position. FIG. 5D shows the shear dissection mechanism 500 in a second position.

Shear dissection mechanism 500 has a similar structure to the shear dissection mechanism 400 of FIG. 4A-C, namely a primary shear body 504 and a cylindrical secondary shear body 506. The primary shear body 504 has four channels formed therein: a first inlet channel 508, second inlet channel 510, first outlet channel 512, and second outlet channel 514. Secondary shear body 506 has a dissection chamber 516 formed therethrough. The dimensions and dimensional relationships between the four channels are consistent with the shear dissection mechanism 400 described above with respect to FIG. 4A-C, namely:

Dissection chamber 516 has a diameter at least as large as the first inlet channel 508.

First outlet channel 512 has a smaller diameter than the dissection chamber 516.

Second outlet channel 514 has a diameter at least as large as the dissection chamber 516.

The following depiction assumes the shear dissection mechanism 500 is pneumatically connected to a vacuum source according to the pneumatic diagram shown in FIG. 2A.

Arthropod 502 has the body type of a female *Anopheles stephensi* mosquito, i.e., with an abdomen 518, a thorax 520, and a head 522. As shown, the thorax 520 has a larger diameter than the thorax 520.

Turning to FIG. 5A, the shear dissection mechanism 500 is in the first position, i.e., with the first inlet channel 508, dissection chamber 516, and first outlet channel 512 aligned such that the vacuum source draws air therethrough. In this configuration, arthropod 502 is drawn into the shear dissection mechanism 500 under the motive force of the connected vacuum source. The arrows indicate the airflow direction. In particular, arthropod 502 is drawn (with its abdomen 518 first) into pneumatic tubing 524, which is operably coupled to first inlet channel 508. In this embodiment, the pneumatic tubing 524 has a diameter that is at least as small as the first inlet channel 508.

Turning to FIG. 5B, the vacuum source draws arthropod 502 through first inlet channel 508 and into dissection chamber 516. Because dissection chamber 516 has a diameter at least as large as first inlet channel 508, arthropod 502 is not damaged by the passage. However, because the first outlet channel 512 has a smaller diameter than the dissection chamber 516, arthropod 502 is prevented from passing all the way through the dissection chamber 516. In particular, first outlet channel 512 has a diameter that is at least as large as the arthropod's abdomen 518, but smaller than the arthropod's thorax 520. Accordingly, the abdomen 518 enters the first outlet channel 512, but the thorax 520 and head 522 remain within the dissection chamber 516. At this point, the arthropod 502 is ready for dissection.

FIG. 5C shows the shear dissection mechanism 500 transitioning between a first position and a second position. In particular, the secondary shear body 506 rotates relative to the primary shear body 504, such as under the action of a servo as described above. This, in turn, causes a shearing action at a shearing interface 526 between the primary shear body 504 and the secondary shear body 506. In particular, the shearing interface 526 includes an edge of the dissection chamber 516 and an opposite edge of the first outlet channel 512. Because the thorax 520 and head 522 of the arthropod 502 remain within the dissection chamber 516 and because the abdomen 518 remains within the first outlet channel 512, this shearing action shears the abdomen 518 from the thorax 520 and head 522.

The separation is complete when the dissection chamber 516 rotates entirely past the first outlet channel 512. The complete movement of the dissection chamber 516 past the first outlet channel 512 also closes off the dissection chamber 516 from the first inlet channel 508 and the first outlet channel 512, such that minimal or no airflow passes therethrough. Advantageously, by closing off the vacuum drawn through the dissection chamber 516, the first portion of the arthropod 502 retained therein (in this case, the thorax 520 and head 522) is not damaged during the transition from the first position to the second position.

The second portion of the arthropod 502 retained in the first outlet channel 512 (in this case, the abdomen 518) is transported out of the shear dissection mechanism 500 (for example, into a first specimen collection tube) by the vacuum, either just before the dissection chamber 516 moves completely past the first outlet channel 512, or when the shear dissection mechanism 500 returns to the first position in a subsequent cycle.

FIG. 5D shows the shear dissection mechanism 500 in the second position, i.e., with the second inlet channel 510, dissection chamber 516, and second outlet channel 514 aligned such that the vacuum source draws air therethrough. In this position, the airflow created by the vacuum source moves the first portion of the arthropod 502 (here, the thorax 520 and head 522) out of the dissection chamber 516 and through the second outlet channel 514, ultimately exiting the shear dissection mechanism 500 through pneumatic tubing 528, from which point it is deposited into a second specimen collection tube. Because second outlet channel 514 has a diameter at least as large as the dissection chamber 516, the first portion of the arthropod 502 is not damaged as it moves between the dissection chamber 516 and the second outlet channel 514.

Subsequently, the shear dissection mechanism 500 may be returned to the first position (again, under the action of a servo) such that any portion of the arthropod 502 remaining in the first outlet channel 512 is moved out of the shear dissection mechanism 500 by the vacuum source.

Thus, by cycling between the first and second positions, the shear dissection mechanism 500 enables rapid, repeatable, and accurate dissection of arthropods.

According to some embodiments, in order to prevent and clear clogs in the shear dissection mechanism 500, a user uses the pneumatically coupled wand to suck up a small volume of water or media every 15-30 dissections (e.g., every 25 dissections). This action pulls wash media though the dissection chamber 516, washing the dissection chamber 516 and carrying any debris into the first specimen collection tube.

Figure 6A:
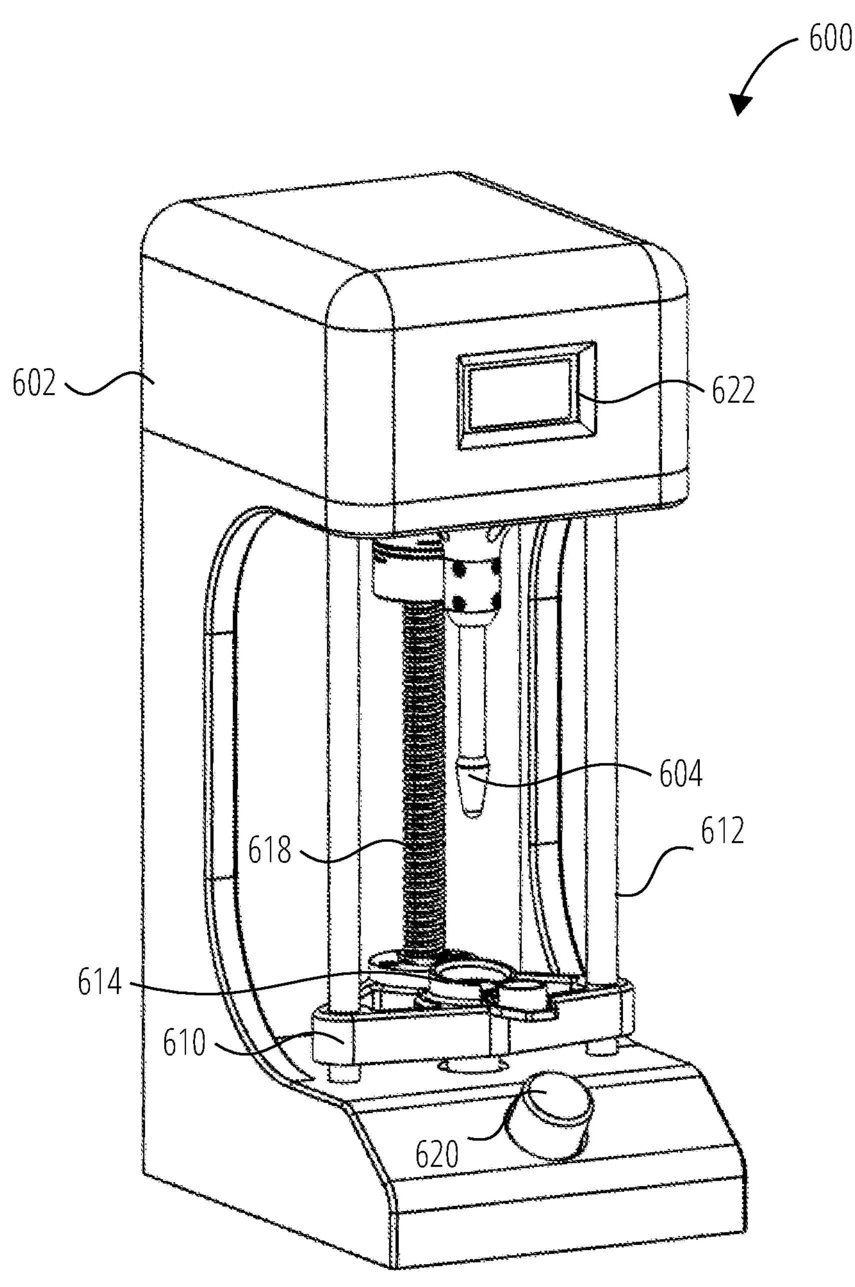
FIG. 6A shows a front left perspective view of a grinder, according to a representative embodiment of the present disclosure.
Figure 6B:
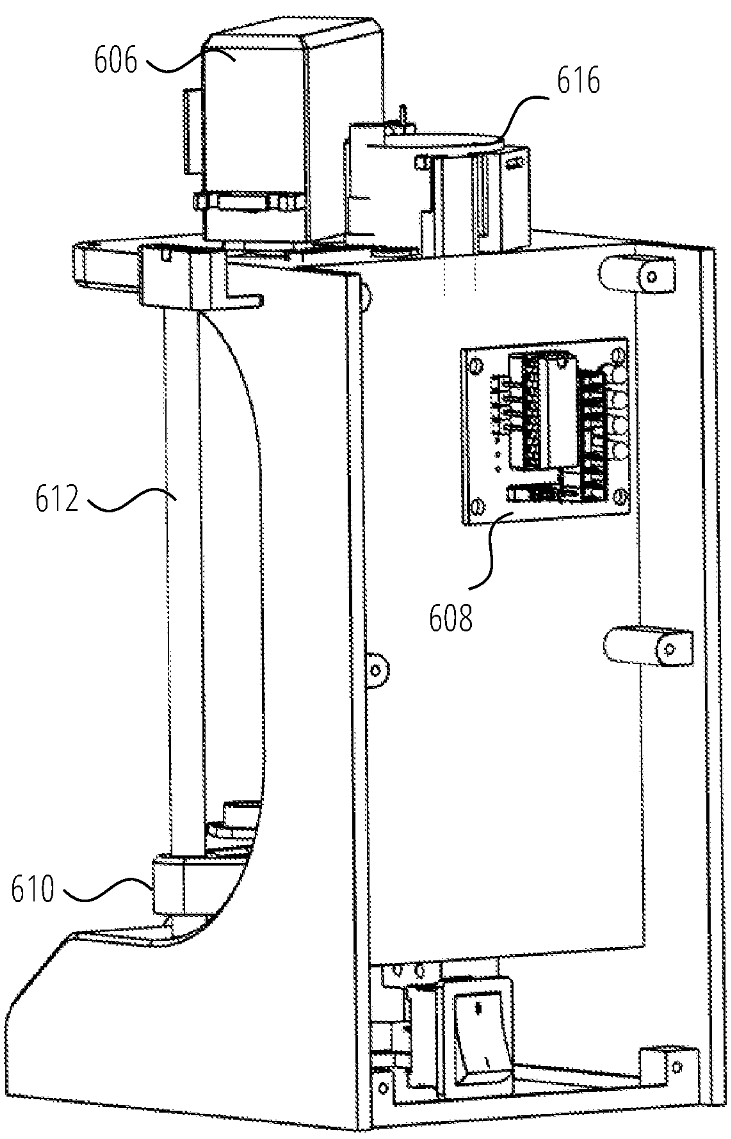
FIG. 6B shows a rear right perspective view of the grinder of FIG. 6A, with a portion of a housing thereof hidden.

FIG. 6A and FIG. 6B show a grinder 600 configured for processing arthropods. As one non-limiting example, the grinder 600 is configured to isolate parasites found in the salivary glands of mosquitos dissected using any of the arthropod dissection apparatuses described herein. Accordingly, in some embodiments, the grinder 600 is provided as part of a biological sample processing system (e.g., an arthropod processing system) that includes any of the arthropod dissection apparatuses provided herein.

The grinder 600 includes a sturdy housing 602 which houses a pestle assembly and a carriage assembly. FIG. 6B shows a rear perspective view with portions of the housing 602 hidden to enable viewing of interior components.

The pestle assembly includes a pestle 604 operably coupled to a drive such as a servo 606 disposed within the housing 602. The servo 606 rotates the pestle 604 under the direction of a controller 608 (e.g., an Arduino microcontroller) which is electrically coupled to the servo 606 and disposed in the housing 602.

The carriage assembly includes a carriage 610 is configured to translate along a track 612 relative to the pestle 604. A consumable test tube 614 is disposed through a test tube aperture of the carriage 610, such that it is positioned directly below the pestle 604. In some embodiments, the test tube 614 does not form part of the grinder assembly. The pestle 604 and test tube 614 are sized such that the pestle 604 fits tightly against the bottom and sides of the test tube 614.

A drive such as a stepper motor 616 disposed in the housing 602 and electrically connected to the controller 608 drives a lead screw 618 which is coupled to a threaded aperture of the carriage 610. Under the direction of the controller 608, the stepper motor 616 rotates the lead screw 618, which in turn causes the carriage 610 to translate upwards and downwards along the track 612.

Controller 608 includes a processor and a data store programmed with logic which, when executed, causes: the servo 606 to rotate the pestle 604 in one or both directions based upon a predetermined number of turns defined by a user via a user input device (such as encoder knob 620); the stepper motor 616 to rotate the lead screw 618 in order to advance the carriage 610 toward the pestle 604 until an upper limit switch senses contact between the pestle 604 and the test tube 614; and the stepper motor 616 to rotate the lead screw 618 in order to withdraw the carriage 610 away from the pestle 604 until a lower limit switch indicates that the test tube 614 has reached a lower extent of travel.

According to a representative method of grinding matter according to the present disclosure, the user places the test tube 614 containing the material to be ground (e.g., mosquito salivary glands) in the carriage 610. The user then selects the number of grinds using the encoder knob 620 electrically connected to the controller 608. A display screen 622 disposed on the housing 602 displays the selected number of grinds. This number determines how thoroughly the material will be ground, and once selected, the grinder 600 raises the pestle 604 using the lead screw 618 and stepper motor 616.

When the pestle 604 contacts the material in the test tube 614, a limit switch is triggered (for example, a pressure sensor operably coupled to sense a compressive pressure applied along the axis of the pestle 604). In response to receiving a signal from the limit switch signaling indicating contact between the pestle 604 and the material in the test tube 614, the stepper motor 616 stops raising the carriage 610, and the servo 606 begins grinding the material according to the predetermined number of grinds provided by the user via the encoder knob 620.

In some embodiments, a biasing device such as a spring attaches the pestle 604 and optionally the servo 606 to the top of the housing 602 in order to increase the downward pressure applied to the material in the test tube 614. With each grind, the test tube 614 is slightly lowered and raised along the track 612 by the stepper motor 616 in order to dislodge material displaced to the side of the test tube 614.

After completing the predetermined number of grinds, the test tube 614 is lowered along the track 612 by the stepper motor 616 until a lower limit switch is triggered. Subsequently, the user can remove the test tube 614 from the carriage 610.

In some embodiments, after grinding of material in the test tube 614, the test tube 614 is centrifuged in order to separate material in the test tube 614. For example, according to a representative method for grinding mosquito material, following the grinding method described above, the test tube 614 is centrifuged for 10-120 seconds at 80-110 G (e.g., 94 G) and 1° C.-10° C. (e.g., 4° C.). This process separates the sporozoite-containing-supernatant from the remaining mosquito material, which will pellet to the bottom of the test tube 614. Advantageously, centrifugation establishes a concentrated pellet at the bottom of the test tube 614, which can be more effectively ground than a dispersed mixture.

Figure 7:
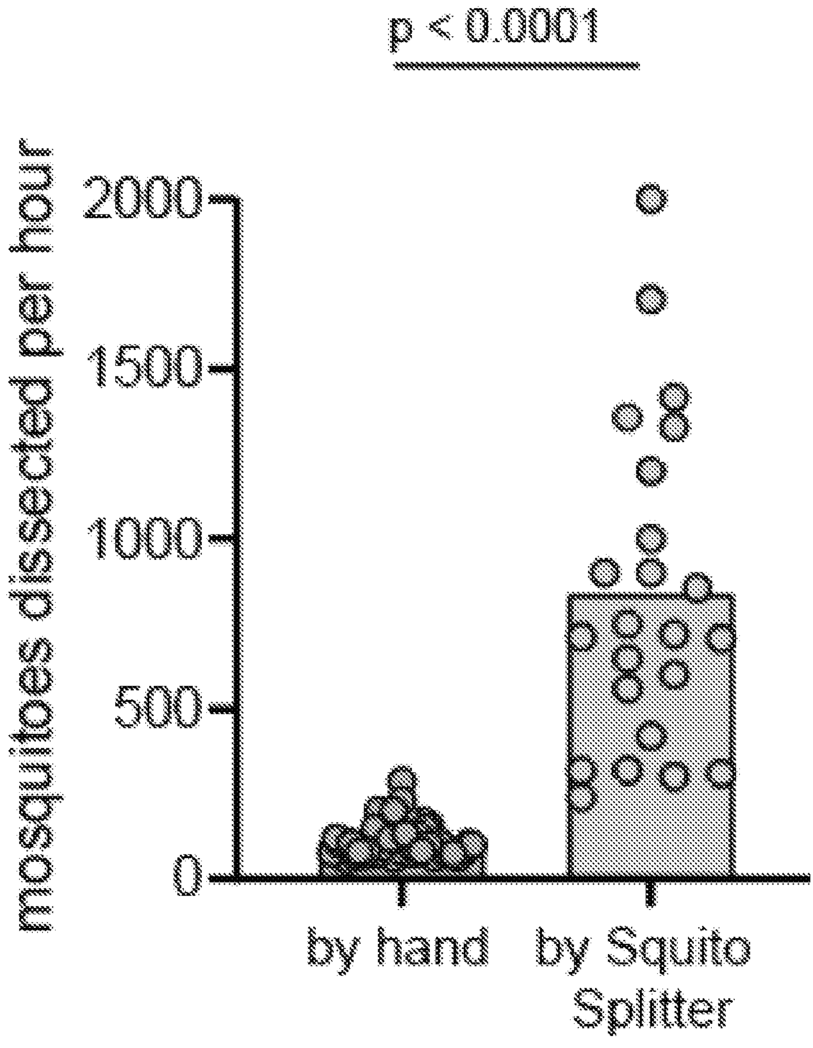
FIG. 7 compares a rate of hand dissecting mosquitos with a rate of dissecting mosquitos with an arthropod dissection apparatus according to a representative embodiment of the present disclosure.
Figure 8:
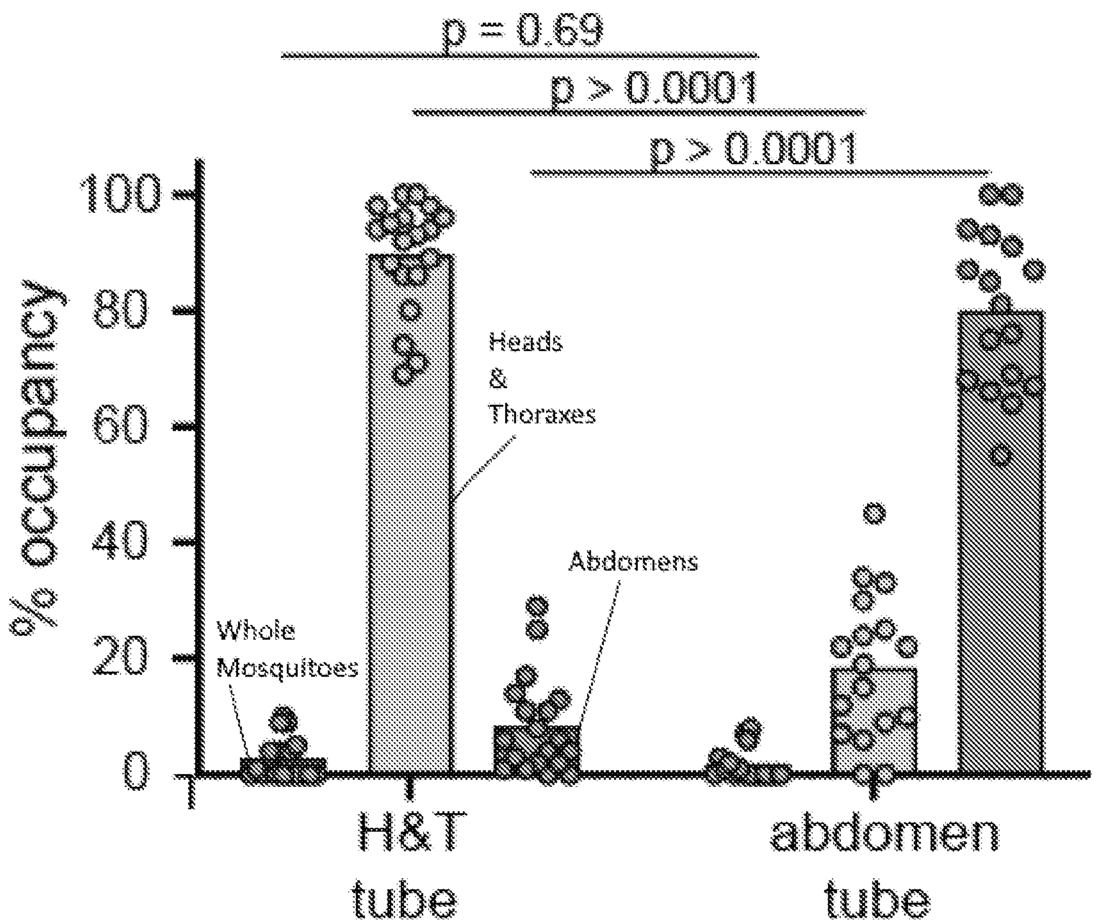
FIG. 8 shows a percentage occupancy of specimen collection tubes of an arthropod dissection apparatus according to a representative embodiment of the present disclosure.

FIG. 7 and FIG. 8 show experimental results which validate the unexpected result provided by the arthropod dissection apparatuses of the present disclosure. The results shown are based upon an arthropod dissection apparatus such as shown in FIG. 1A-FIG. 4C, which was used according to a method consistent with that shown in FIG. 5A-FIG. 5D.

FIG. 7 compares the dissection rate of mosquitos between a hand-dissection method and using an arthropod dissection apparatus as provided herein. By hand, an average of 113 mosquitoes per hour were dissected. Using the arthropod dissection apparatus, 838 mosquitos per hour were dissected—a 642% improvement.

FIG. 8 evaluates the accuracy of the arthropod dissection apparatuses of the present disclosure by determining a) what portion of mosquito parts in the first specimen collection tube (in this case, the abdomen collection tube) were in fact abdomens and b) what portion of mosquito parts in the second specimen collection tube (in this case, the head/thorax collection tube) were in fact heads and thoraxes. On average, of the objects within the abdomen tube, 79.9% were in fact abdomens. On average, of the objects within the head and thorax collection tube, 89.5% were heads and thoraxes.

Advantageously, the foregoing systems, devices, and methods enable rapid, accurate, and repeatable dissection of biological samples, which represent a significant improvement over known dissection methods.

The present application may also reference quantities and numbers. Unless specifically stated, such quantities and numbers are not to be considered restrictive, but representative of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, circuitry includes one or more ASICs having a plurality of predefined logic components. In an embodiment, circuitry includes one or more FPGA having a plurality of programmable logic components. In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like. In an embodiment, circuitry includes a baseband integrated circuit or applications processor integrated circuit or a similar integrated circuit in a server, a cellular network device, other network device, or other computing device. In an embodiment, circuitry includes one or more remotely located components. In an embodiment, remotely located components are operatively connected via wireless communication. In an embodiment, remotely located components are operatively connected via one or more receivers, transmitters, transceivers, or the like.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, circuitry includes one or more user input/output components that are operatively connected to at least one computing device to control (electrical, electromechanical, software-implemented, firmware-implemented, or other control, or combinations thereof) one or more aspects of the embodiment.

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

We claim:

1. An arthropod dissection apparatus, comprising:

a shear dissection mechanism, comprising:

a primary shear body having an inlet channel, a first outlet channel, and a second outlet channel formed therein; and a secondary shear body disposed in an aperture of the primary shear body and having a dissection chamber formed therein, the secondary shear body being movable between a first position and a second position relative to the primary shear body, wherein in the first position, the dissection chamber pneumatically connects the inlet channel to the first outlet channel, wherein in the second position, the dissection chamber pneumatically connects the inlet channel to the second outlet channel, wherein movement of the secondary shear body from the first position to the second position causes a shearing action at a shearing interface between the secondary shear body and the primary shear body;

the arthropod dissection apparatus further comprising a vacuum connector pneumatically couplable to the first outlet channel and the second outlet channel, wherein the shear dissection mechanism is configured such that, when the vacuum connector is pneumatically coupled to a vacuum source and the secondary shear body is in the first position, the vacuum source draws a vacuum through the inlet channel, the dissection chamber, and the first outlet channel, wherein the shear dissection mechanism is configured such that when the vacuum connector is pneumatically coupled to the vacuum source and the secondary shear body is in the second position, the vacuum source draws the vacuum through an air inlet of the secondary shear body, the dissection chamber, and the second outlet channel.

2. The arthropod dissection apparatus of claim 1, wherein the first outlet channel has a smaller diameter than the dissection chamber.

3. The arthropod dissection apparatus of claim 2, wherein the first outlet channel has a first diameter and wherein the dissection chamber has a second diameter, wherein the first diameter is 50%-75% of the second diameter.

4. The arthropod dissection apparatus of claim 2, wherein the first outlet channel has a first diameter and wherein the dissection chamber has a second diameter, wherein the first diameter is 0.50 mm-1.00 mm smaller than the second diameter.

5. The arthropod dissection apparatus of claim 2, wherein the first outlet channel has a smaller diameter than the second outlet channel.

6. The arthropod dissection apparatus of claim 2, wherein the first outlet channel and the dissection chamber form the shearing interface.

7. The arthropod dissection apparatus of claim 1, wherein the secondary shear body is a cylinder that rotates relative to the primary shear body between the first position and the second position.

8. The arthropod dissection apparatus of claim 1, further comprising:

a first specimen collection tube pneumatically coupled to the first outlet channel by a first pneumatic tubing, wherein the vacuum connector is pneumatically couplable to the first pneumatic tubing between the first specimen collection tube and the first outlet channel; and a second specimen collection tube pneumatically coupled to the second outlet channel by a second pneumatic tubing, wherein the vacuum connector is pneumatically couplable to the second pneumatic tubing between the second specimen collection tube and the second outlet channel.

9. The arthropod dissection apparatus of claim 8, further comprising a pressure regulator pneumatically coupled between the first pneumatic tubing and the second pneumatic tubing.

10. The arthropod dissection apparatus of claim 1, further comprising a wand pneumatically coupled to the inlet channel of the shear dissection mechanism via a flexible pneumatic tubing.

11. The arthropod dissection apparatus of claim 10, wherein the flexible pneumatic tubing has a smaller diameter than the inlet channel, and wherein the inlet channel has a smaller diameter than the dissection chamber.

12. The arthropod dissection apparatus of claim 1, further comprising a drive operably coupled to move the secondary shear body between the first position and the second position.

13. The arthropod dissection apparatus of claim 12, further comprising an actuator and a controller operably coupled to the actuator and to the drive, wherein actuation of the actuator sends a signal to the controller, and in response to the signal, the controller sends a second signal to the drive, causing the drive to move the secondary shear body between the second position and the first position.

14. The arthropod dissection apparatus of claim 13, further comprising a display screen operably connected to the controller, wherein the controller comprises logic, which when executed: stores a number of cycles of the actuator; and displays the number of cycles on the display screen.

15. An arthropod processing system, comprising:

the arthropod dissection apparatus of claim 1; and a grinder, comprising:

a pestle assembly comprising a rotating pestle; and a carriage assembly comprising a carriage having a test tube aperture configured to hold a test tube, wherein the carriage is configured to translate relative to the rotating pestle.

16. The arthropod processing system of claim 15, wherein the carnage is configured to translate along a track relative to the pestle.

17. The arthropod processing system of claim 16, wherein the grinder further comprises a first drive operably coupled to a lead screw configured to translate the carriage along the track.

18. The arthropod processing system of claim 17, wherein the grinder further comprises a second drive configured to rotate the pestle.

19. The arthropod processing system of claim 17, wherein the grinder further comprises a second controller operably coupled to the pestle assembly and the carriage assembly, wherein the second controller comprises logic, which when executed: advances the carriage toward the pestle; and rotates the pestle a predetermined number of grinds based upon an input from a user input device.

20. A method of dissecting an arthropod using the arthropod dissection apparatus of claim 1, comprising:

moving the arthropod through the inlet channel of the primary shear body into the dissection chamber of the secondary shear body, wherein moving the arthropod comprises drawing the arthropod into the dissection chamber using the vacuum source pneumatically coupled to the vacuum connector that is pneumatically coupled to the first outlet channel of the primary shear body, the second outlet channel of the primary shear body, and the secondary shear body;

moving the arthropod partially, including by drawing the arthropod partially using the vacuum source, through a constriction between the dissection chamber and the first outlet channel connected to the dissection chamber such that a larger diameter portion of the arthropod is held in the dissection chamber by the constriction and a smaller diameter portion of the arthropod is disposed in the first outlet channel; and shearing the larger diameter portion of the arthropod from the smaller diameter portion of the arthropod by moving the dissection chamber relative to the first outlet channel.

21. The method of claim 20, further comprising: evacuating the larger diameter portion of the arthropod through the second outlet channel.

22. The method of claim 21, further comprising: evacuating the smaller diameter portion of the arthropod through the first outlet channel.

23. The method of claim 22, wherein moving the dissection chamber relative to the first outlet channel includes rotating the dissection chamber relative to the first outlet channel.

24. The method of claim 20, further comprising grinding the larger diameter portion of the arthropod.

* * * * *